No. 624,206. Patented May 2, 1899.
H. J. HALM.
COOKING UTENSIL.
(Application filed Jan. 30, 1899.)
(No Model.) 2 Sheets—Sheet 1.

Witnesses:
W. J. Jacker.
O. A. Duggan.

Inventor:
Henry J. Halm.
By Chas. C. Tillman, Atty.

No. 624,206. Patented May 2, 1899.
H. J. HALM.
COOKING UTENSIL.
(Application filed Jan. 30, 1899.)
(No Model.) 2 Sheets—Sheet 2.

Witnesses:
R. J. Jacker.
E. A. Duggan.

Inventor:
Henry J. Halm.
By Chas. C. Tillman, Atty.

THE NORRIS PETERS CO., PHOTO-LITHO., WASHINGTON, D. C.

UNITED STATES PATENT OFFICE.

HENRY J. HALM, OF PERU, ILLINOIS.

COOKING UTENSIL.

SPECIFICATION forming part of Letters Patent No. 624,206, dated May 2, 1899.

Application filed January 30, 1899. Serial No. 703,772. (No model.)

*To all whom it may concern:*

Be it known that I, HENRY J. HALM, a citizen of the United States, residing at Peru, in the county of La Salle and State of Illinois, have invented certain new and useful Improvements in Cooking Utensils, of which the following is a specification.

This invention relates to improvements in a utensil to be used on the tops of stoves for cooking various kinds of food, and while it is more especially designed to be used for cooking steaks, ham, eggs, buckwheat cakes, and similar articles of food, yet with slight changes in its construction it may be employed for cooking vegetables, such as cabbage, potatoes, onions, &c.; and it consists in certain peculiarities of the construction, novel arrangement, and operation of the various parts thereof, as will be hereinafter more fully set forth and specifically claimed.

The various articles of food cooked on the tops of stoves have heretofore generally been cooked in open vessels or in vessels with covers thereon which would permit of the escape of the odors therefrom, which odors permeate the house and are especially disagreeable to the person doing the cooking, often causing headaches and other discomforts.

It is therefore the principal object of my invention to provide a cooking utensil which shall be simple and inexpensive in construction, strong, durable, and effective, and satisfactory in operation and which may be readily placed in position on the stove, easily cleansed, and will prevent the escape into the room of smoke, steam, and odors from the food which is being cooked.

In order to enable others skilled in the art to which my invention pertains to make and use the same, I will now proceed to describe it, referring to the accompanying drawings, in which—

Figure 1:
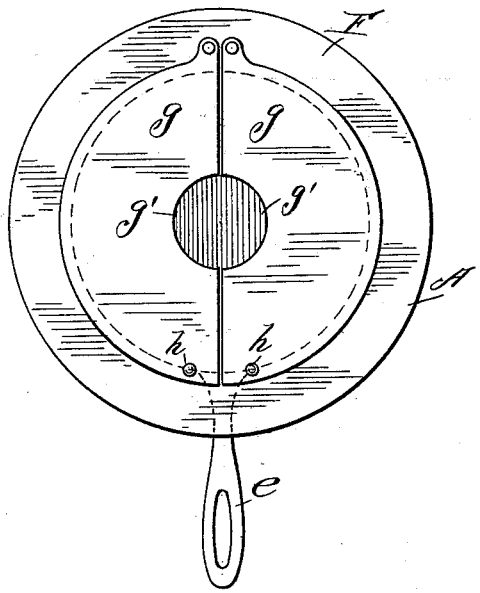
Figure 2:
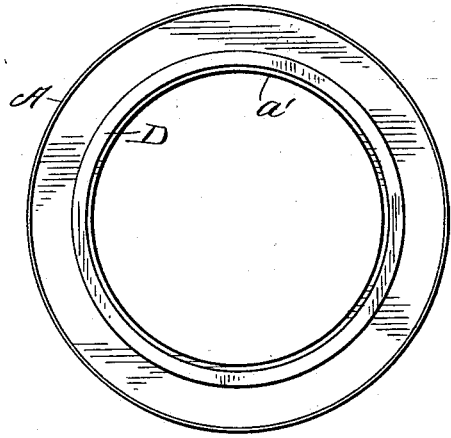
Figure 4:
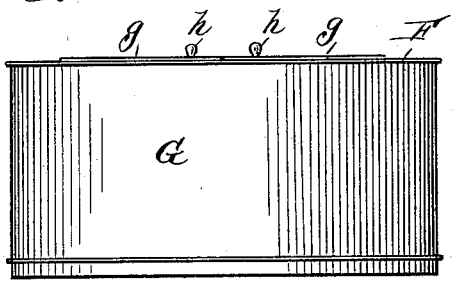
Figure 3:
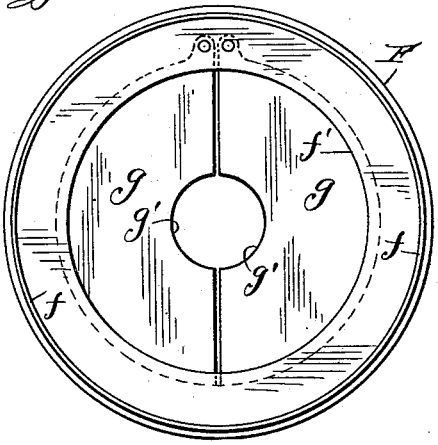
Figure 5:
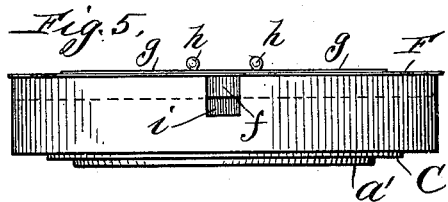
Figure 6:
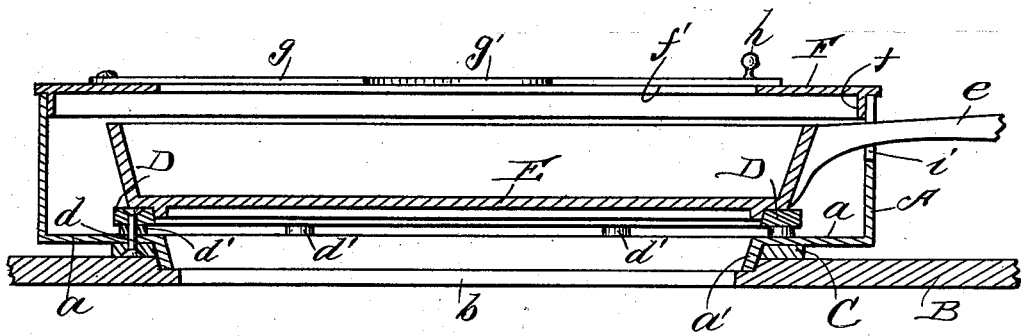
Figure 7:
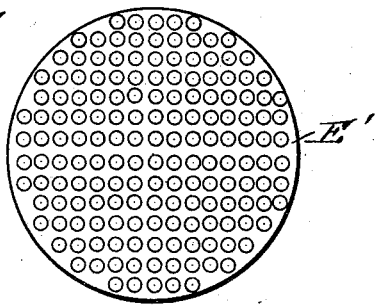
Figure 8:
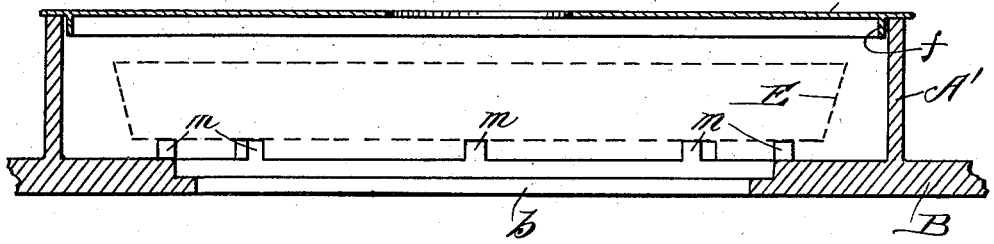

Figure 1 is a top view of my invention, showing the parts in position ready for use and illustrating a spider or frying-pan located thereon. Fig. 2 is a top plan view of the utensil with the cover thereof removed. Fig. 3 is a bottom plan view of the cover. Fig. 4 is a view in side elevation of an attachment to be used when a deep vessel is employed for boiling purposes or for cooking vegetables. Fig. 5 is a view in front elevation of the utensil, showing the opening for the handle of the spider or frying-pan. Fig. 6 is an enlarged sectional view of a portion of the top of a stove with my utensil in position thereon. Fig. 7 is a plan view of a broiling-iron which may sometimes be used in my invention; and Fig. 8 is an enlarged sectional view of a modification in the construction of my utensil.

Similar letters refer to like parts throughout the different views of the drawings.

A represents the body of the utensil, which is cylindrical in form and may be made of any suitable size and material and is provided with a floor $a$, which extends inwardly and is formed with a downturned annular flange $a'$ around the opening therein to fit within the eye or opening $b$ of the top of the stove B, which may be formed, as usual, with a number of openings or eyes and provided with covers therefor. Located on the bottom of the floor $a$ and around the flange $a'$ is a ring C, through which the rivets $d$, which secure the ring D in position on the upper surface of the floor $a$ of the utensil, pass. The ring D is held slightly above the upper surface of the floor $a$ by means of washers $d'$, which surround the rivets $d$, as is clearly shown in Fig. 6 of the drawings. By reference to Figs. 2 and 6 of the drawings it will be seen and clearly understood that the ring D, which supports the frying-pan or spider E or broiling-iron E' or other vessel, is located some distance from the upright walls or body A, so as to allow air to pass therebetween and thereunder.

The cover F of the utensil is formed with a downturned annular flange $f$, which fits within the body A and has a central opening $f'$, as is clearly shown in Figs. 1, 3, and 6 of the drawings. Pivotally secured to the upper part of the cover F are two doors $g$, which are provided with semicircular openings $g'$ in their middle portions to admit air to the interior of the utensil and which have knobs $h$ to turn the same when access to the interior of the utensil is desired.

The body A is provided at a suitable point with an opening $i$ for the handle $e$ of the spider or frying-pan.

When it is desired to broil meats or steaks or other articles of food, a broiling-iron of the type shown in Fig. 7 of the drawings may be employed, in which case it will rest on the ring D and be supported thereby in a similar manner to that in which the spider or frying-pan is supported.

Should it be desired to use the utensil for cooking vegetables or for boiling purposes, in either of which cases it is necessary to use a deep vessel, such as a pot or boiler, the attachment G, (shown in Fig. 4 of the drawings,) which is cylindrical in shape, with its bottom open, may be inserted in the top of the body or wall A and its top closed by means of a cover F of the construction above described.

In Fig. 8 of the drawings I have illustrated a modification in the construction of my utensil which consists in forming the top B of the stove with a circular wall A' around the opening or eye $b$ therein and providing it near the edge of said opening or eye with a number of projections or studs $m$ to support the frying-pan or spider E or other vessel. In this construction the cover F, of a similar construction to that illustrated in the other figures and above described, may be employed.

The operation of my utensil is simple and as follows: The device is placed on the stove so that the flange $a'$ will fit in the eye or opening thereof, when the frying-pan or spider E or other device used for holding the article of food to be cooked may be placed on the ring D, which will support it at a distance from the floor $a$, as well as from the body or wall A. The cover F is then placed on the top of the body or wall A, when the doors $g$ may be turned on their pivots, so as to increase or diminish the opening $f'$ in the cover, thus admitting more or less air, as is desired, to the interior of the utensil. In the process of cooking the smoke and odors arising from the articles being cooked will be drawn, by reason of the draft, through the opening in the cover F between the ring D and the floor $a$, through the opening or eye $b$ of the stove, and pass out with the draft thereof, thus preventing the escape of odors and smoke into the room, as is apparent. It is also apparent that as the wall or body of the utensil surrounds the frying-pan, spider, or other vessel it will prevent any grease or other substance flying therefrom falling on the stove, thus preventing the stove becoming dirty or soiled.

Having thus fully described my invention, what I claim as new, and desire to secure by Letters Patent, is—

1. The combination with a stove, of a wall surrounding the eye or opening therein, means to support the cooking implement within said wall at a distance above the edge of the opening in the stove, and a cover located on the top of said wall and having the central opening $f'$, the doors $g$, pivotally secured to the portion F, at one of their ends and provided with openings $g'$, in their middle, substantially as described.

2. The combination with the wall or body A, having the floor $a$, provided with the downturned flange $a'$, around its opening, the ring C, secured to the lower surface of the floor, the ring D, located a slight distance above the floor, the washers $d'$, interposed between the floor and the ring D, the rivets $d$, passing through the ring C, floor, washers and ring D, a cover F, located on the top of the wall or body and having a central opening, and the doors $g$, pivotally secured on the cover and having central openings, substantially as described.

HENRY J. HALM.

Witnesses:
CHAS. C. TILLMAN,
E. A. DUGGAN.